Figure 1:
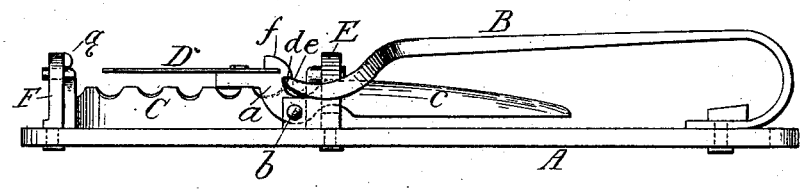

(No Model.)

C. WALKER & W. ALLSOPP.
ANIMAL TRAP.

No. 379,087. Patented Mar. 6, 1888.

Witnesses:
John A. Rennie
Paschal J. Ferrara

Inventors:
Cyril Walker
and William Allsopp
By their Attorneys
Arthur C. Fraser & Co.

UNITED STATES PATENT OFFICE.

CYRIL WALKER AND WILLIAM ALLSOPP, OF WOLVERHAMPTON, COUNTY OF STAFFORD, ENGLAND; SAID ALLSOPP ASSIGNOR TO SAID WALKER.

ANIMAL-TRAP.

SPECIFICATION forming part of Letters Patent No. 379,087, dated March 6, 1888.

Application filed April 18, 1887. Serial No. 235,187. (No model.) Patented in England October 5, 1886, No. 12,654.

*To all whom it may concern:*

Be it known that we, CYRIL WALKER and WILLIAM ALLSOPP, both residing at Wolverhampton, in the county of Stafford, England, subjects of the Queen of Great Britain, have invented certain new and useful Improvements in Animal-Traps, of which the following is a specification.

This invention has been patented to us in Great Britain by Letters Patent No. 12,654, dated October 5, 1886.

This invention relates to that class of vermin-traps and other traps for catching or catching and killing animals which operate by means of a spring acting to close together a pair of jaws. To set such traps as they are usually constructed it is necessary to first compress a powerful spring, so as to allow the jaws to fall open, and then while the spring is held down to pass a catch-piece over one of the jaws and raise a plate situated between such jaws until a catch thereon gears with the catch-piece and thus retains the jaw over which it passes, and consequently prevents the spring from rebounding until the plate is depressed by the pressure of an animal or otherwise, and thus releases the catch-piece. The operation of setting the trap involves considerable risk of getting the hand caught between the jaws by the trap closing accidentally; and the object of this invention is to construct a trap of the class referred to so that it may be set by simply pressing down the spring by the foot or hand, thus avoiding any risk and materially facilitating the operation.

In constructing a trap according to this invention the plate by which the pressure of an animal is made to set off the trap is hinged transversely at its end, which is toward the usual spring, and the hinge-piece of such plate is extended beyond the pin or fulcrum and between the spring and frame, and is made sufficiently heavy to form a counter-weight in order to press up the plate. The hinge-piece is formed into a backwardly-projecting catch immediately over the pin or fulcrum, and the forward or inner end of the spring is shaped to engage with such catch. When the trap is closed, the counterweighted extension of the hinge-piece overbalances the plate.

To set the trap, the spring is simply pressed down, with the effect that the forward or inner end thereof presses upon a curved or slanted top of the catch and pushes such catch, and consequently the plate also, in a backward and downward direction, at the same time raising the counter-weight until the spring is depressed sufficiently to clear the catch, whereupon the counter-weight falls, raising the plate and bringing the catch over the end of the spring, when, upon releasing the spring, it is retained by the catch. A lug is formed to project from the inner face of the support or bracket carrying the outer ends of the jaws in position to prevent the jaws from both falling over on the same side as the spring is compressed.

Figure 2:
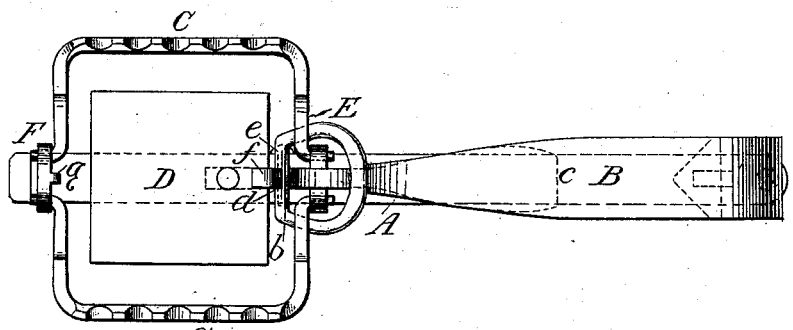
Figure 4:
Figure 3:
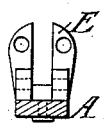

Figure 1 is a side elevation of our improved trap when set, shown, for clearness of illustration, with the nearer jaw removed. Fig. 2 is a plan of the trap when set; Fig. 3, a section through the frame and elevation of the inner face of the support carrying the inner ends of the jaws and the hinge-pin; and Fig. 4, a corresponding section to Fig. 3, but showing the inner face of the support carrying the outer ends of the jaws.

The frame A, spring B, and jaws C C are all of the usual character. The plate D is carried upon a hinge-piece, $a$, carried upon a transverse fulcrum, $b$, near the inner end of the spring, and having an extension, $c$, made sufficiently heavy to constitute a counter-weight for the plate. A catch, $d$, is formed on the hinge-piece, in position immediately over the hinge-pin $b$, and the end $e$ of the spring is shaped to gear with and be retained by the catch when the trap is set. The top $f$ of the catch is curved, or slanted back, as shown, and as the spring is pressed down to set the trap the end $e$ of the spring, bearing upon the part $f$, pushes back the catch, and with it the plate, against the counterbalancing weight of the extension $c$ of the hinge-piece until it passes immediately below the catch, whereupon the extension $c$ presses up the plate and brings the catch over the end of the spring and retains it when released, and thus the trap is set. If the trap is thus set too hard, the extension $c$ may be carefully raised until the trap is set as lightly as may be desired.

It will be seen that by the employment of this invention there is no need to pass the hand over the trap when the jaws are open.

The support E is slotted down from the top for the passage therethrough of the extension c of the hinge-piece.

A lug, g, is formed to project from the inner face of the support F, so as to prevent the jaws from both falling on the same side as the spring is compressed.

We are aware of the construction of animal-trap disclosed in the application of Cattell and Summers, filed May 28, 1887, Serial No. 239,721, and we make no claim to that construction, which, however, is materially different from ours.

Having fully described our invention, what we claim, and desire to secure by Letters Patent, is—

1. An animal-trap consisting of the combination of a base-plate, the jaws pivoted thereto and adapted to close together, a spring pressing upward against said jaws adjacent to their pivots and tending thereby to close them, and a counterweighted pivoted catch-piece, which, when the trap is set, hooks over the spring and holds it down, whereby the trap sets itself on the compression of the spring.

2. An animal-trap consisting of the combination of a base plate, the jaws pivoted thereto and adapted to close together, a spring pressing upward against said jaws adjacent to their pivots and tending thereby to close them, a pivoted catch-piece, which, when the trap is set, hooks over the spring and holds it down, and which is beveled on its upper side in order to be displaced by the compression of the spring, a releasing-plate in connection with said catch-piece, and a counter-weight for pressing up the catch and plate.

3. An animal-trap consisting of the combination of pivoted jaws, a spring for closing them, and a lever fulcrumed near the free end of the spring and formed with a catch above its fulcrum for engaging the spring, with a plate on one side of its fulcrum and a counter-weight on the opposite side of its fulcrum for pressing up said plate and moving said catch over the spring when the latter is compressed.

4. In an animal-trap, the combination of jaws C C, spring B, plate D, hinge-piece a, connected to said plate and having a counterweighted extension, c, and catch d, for engaging the spring, beveled so as to be displaced by the spring as the latter is compressed, and axial pin b.

In witness whereof we have hereunto signed our names each in the presence of two subscribing witnesses.

CYRIL WALKER.
WILLIAM ALLSOPP.

Witnesses to the signature of the said Cyril Walker:
GEO. MIDDLETON,
ALEX. GRAY.

Witnesses to the signature of the said William Allsopp:
STEPHEN WATKINS,
ROBERT M. LISTER.